US 11,783,543 B2

(12) United States Patent
Upendran et al.

(10) Patent No.: US 11,783,543 B2
(45) Date of Patent: Oct. 10, 2023

(54) METHOD AND SYSTEM FOR DISPLAYING AND NAVIGATING AN OPTIMAL MULTI-DIMENSIONAL BUILDING MODEL

(71) Applicant: Hover Inc., San Francisco, CA (US)

(72) Inventors: Manish Upendran, San Francisco, CA (US); Adam J. Altman, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 0 days.

(21) Appl. No.: 17/202,578

(22) Filed: Mar. 16, 2021

(65) Prior Publication Data

US 2021/0201579 A1    Jul. 1, 2021

Related U.S. Application Data

(63) Continuation of application No. 16/848,844, filed on Apr. 15, 2020, now Pat. No. 10,977,862, which is a (Continued)

(51) Int. Cl.
*G06T 19/00* (2011.01)
*G06T 17/05* (2011.01)
(Continued)

(52) U.S. Cl.
CPC .............. *G06T 19/00* (2013.01); *G06T 15/04* (2013.01); *G06T 15/20* (2013.01); *G06T 17/05* (2013.01);
(Continued)

(58) Field of Classification Search
CPC ......... G06T 19/00; G06T 15/04; G06T 15/20; G06T 17/05; G06T 2210/04;
(Continued)

(56) References Cited

U.S. PATENT DOCUMENTS 4,798,028 A    1/1989   Pinion
5,973,697 A    10/1999  Berry et al.
(Continued)

FOREIGN PATENT DOCUMENTS

JP    2006116330        *  5/2006    ............. A63F 13/42
WO   2007147830 A1   12/2007
(Continued)

OTHER PUBLICATIONS

Chittaro, L., Gatla, V., Venkataraman, S., The Interactive 3D BreakAway Map: A navigation and examination aid for multi-floor 3D worlds, Nov. 2005, Proceedings of the 2005 International Conference on Cyberworlds, pp. 1-8. (Year: 2005).*
(Continued)

*Primary Examiner* — Maurice L. McDowell, Jr.

(57) ABSTRACT

Visualizing three dimensional content is complicated by display platforms capable of more degrees of freedom to display the content than interface tools have to navigate that content. Disclosed are methods and systems for displaying select portions of the content and generating virtual camera positions with associated look angles for the select portions, such as planar geometries of a three dimensional building, thereby constraining the degrees of freedom for improved navigation through views of the content. Look angles can be associated with axes of the content and fields of view.

12 Claims, 9 Drawing Sheets

Related U.S. Application Data continuation of application No. 16/186,163, filed on Nov. 9, 2018, now Pat. No. 10,657,714, which is a continuation of application No. 15/721,062, filed on Sep. 29, 2017, now Pat. No. 10,127,721, which is a continuation-in-part of application No. 15/255,952, filed on Sep. 2, 2016, now abandoned, which is a continuation of application No. 14/339,992, filed on Jul. 24, 2014, now Pat. No. 9,437,044.

(60) Provisional application No. 61/858,241, filed on Jul. 25, 2013.

(51) Int. Cl.
  *G06T 15/20* (2011.01)
  *G06V 20/10* (2022.01)
  *G06V 20/64* (2022.01)
  *G06T 15/04* (2011.01)

(52) U.S. Cl.
  CPC .......... *G06V 20/176* (2022.01); *G06V 20/653* (2022.01); *G06T 2200/08* (2013.01); *G06T 2210/04* (2013.01); *G06T 2210/56* (2013.01)

(58) Field of Classification Search
  CPC ............ G06T 2200/08; G06T 2210/56; G06V 20/176; G06V 20/653
  See application file for complete search history.

(56) References Cited

U.S. PATENT DOCUMENTS

| | | | |
|---|---|---|---|
| 6,212,420 B1* | 4/2001 | Wang | G06T 7/0012 600/407 |
| 7,003,136 B1* | 2/2006 | Harville | G06T 7/285 382/209 |
| 7,218,318 B2 | 5/2007 | Shimazu | |
| 7,814,436 B2 | 10/2010 | Schrag et al. | |
| 8,040,343 B2 | 10/2011 | Kikuchi et al. | |
| 8,098,899 B2 | 1/2012 | Ohashi | |
| 8,139,111 B2 | 3/2012 | Oldroyd | |
| 8,243,065 B2* | 8/2012 | Kim | G01C 21/3638 345/419 |
| 8,339,394 B1 | 12/2012 | Lininger | |
| 8,350,850 B2 | 1/2013 | Steedly et al. | |
| 8,390,617 B1 | 3/2013 | Reinhardt | |
| 8,401,222 B2* | 3/2013 | Thornberry | G06T 7/62 382/100 |
| 9,478,031 B2 | 10/2016 | Bhatawadekar et al. | |
| 9,727,834 B2 | 8/2017 | Reyes | |
| 2003/0014224 A1 | 1/2003 | Guo et al. | |
| 2003/0052896 A1 | 3/2003 | Higgins et al. | |
| 2003/0184545 A1* | 10/2003 | Ohto | G06V 20/13 345/419 |
| 2004/0085335 A1* | 5/2004 | Burlnyk | G06T 15/20 715/716 |
| 2004/0119819 A1* | 6/2004 | Aggarwal | G08B 13/19641 348/E7.086 |
| 2004/0196282 A1 | 10/2004 | Oh | |
| 2005/0128212 A1 | 6/2005 | Edecker et al. | |
| 2005/0148859 A1* | 7/2005 | Miga | G06T 7/38 600/410 |
| 2006/0037279 A1 | 2/2006 | Onchuck | |
| 2007/0168153 A1 | 7/2007 | Minor et al. | |
| 2008/0221843 A1 | 9/2008 | Shenkar et al. | |
| 2009/0043504 A1 | 2/2009 | Bandyopadhyay et al. | |
| 2010/0045869 A1 | 2/2010 | Baseley et al. | |
| 2010/0074532 A1 | 3/2010 | Gordon et al. | |
| 2010/0110074 A1 | 5/2010 | Pershing | |
| 2010/0114537 A1 | 5/2010 | Pershing | |
| 2010/0214291 A1 | 8/2010 | Muller et al. | |
| 2010/0241628 A1 | 9/2010 | Levanon | |
| 2011/0029897 A1 | 2/2011 | Russell | |
| 2011/0181589 A1 | 7/2011 | Quan et al. | |
| 2012/0182392 A1 | 7/2012 | Kearns et al. | |
| 2012/0224770 A1 | 9/2012 | Strassenburg-Kleciak | |
| 2013/0195362 A1 | 8/2013 | Janky et al. | |
| 2013/0202157 A1 | 8/2013 | Pershing | |
| 2013/0257850 A1 | 10/2013 | Chen et al. | |
| 2014/0212028 A1 | 7/2014 | Ciarcia | |
| 2015/0086084 A1 | 3/2015 | Falconer et al. | |
| 2016/0350969 A1 | 12/2016 | Castillo et al. | |

FOREIGN PATENT DOCUMENTS

| | | |
|---|---|---|
| WO | 2011079241 A1 | 6/2011 |
| WO | 2011091552 A1 | 8/2011 |

OTHER PUBLICATIONS

Abdul Hasanulhakeem1; A tool to measure dimensions of buildings in various scales for Google Earth Plug-ins and 3D maps; Aug. 6, 2010; pp. 1-2 downloaded from internet: [https://groups.google.com/forum/#topic/google-earth-browser-plugin/frlvZQ-m38l].

Bansal, et al., "Geo-Localization of Street Views with Aerial Image Databases," Nov. 28-Dec. 1, 2011, pp. 1125-1128.

Becker, et al., "Semiautomatic 3-D model extraction from uncalibrated 2-D camera views," MIT Media Laboratory, Apr. 1995, 15 pages.

Caramba App Development, "EasyMeasure-Measure with your Camera on the App Store on iTunes", https://itunes.apple.com/us/app/easymeasure-measure-measure-your-camera/id349530105mt=8, 2010, 2 pages.

Chen, et al., "City-Scale Landmark Identification on Mobile Devices," Jul. 2011, pp. 737-744.

Fairfax County Virginia, "Virtual Fairfax," http://www.fairfaxcounty.gov/gis/virtualfairfax, Feb. 24, 2014; 2 pages.

Fruh and Zakhor, "Constructing 3D City Models by Merging Aerial and Ground Views," IEEE Computer Graphics and Applications, Nov./Dec. 2003, pp. 52-61, 10 pages.

Huang and Wu, et al., "Towards 3D City Modeling through Combining Ground Level Panoramic and Orthogonal Aerial Imagery," 2011 Workshop on Digital Media and Digital Content Management, pp. 66-71, 6 pages.

Jaynes, "View Alignment of Aerial and Terrestrial Imagery in Urban Environments," Springer-Verlag Berlin Heidelber1 1999, pp. 3-19, 17 pages.

Kroepfl, et al., "Efficiently Locating Photographs in Many Panoramas," Nov. 2-5, 2010, ACM GIS10.

Lee, et al., "Automatic Integration of Facade Textures into 3D Building Models with a Projective Geometry Based Line Clustering," Eurographics 2002, vol. 2, No. 3, 10 pages.

Lee, et al., "Integrating Ground and Aerial Views for Urban Site Modeling," 2002; 6 pages.

Chittaro, L., Gatla, V., Venkataraman, S., The Interactive BreakAway Map: A navigation and examination aid for multi-floor worlds, Nov. 2005, Proceedings of the 2005 International Conference on Cyberworlds, pp. 1-8.

Xiao, et al., "Image-based Facade Modeling," ACM Transaction on Graphics (TOG), 2008, 10 pages.

Ou et al., "A New Method for Automatic Large Scale Map Updating Using Mobile Mapping Magery", Sep. 2013, Wiley Online Library, vol. 28, No. 143, pp. 240-260.

Pu et al., "Automatic Extraction of Building Features From Terrestrial Laser Scanning," 2006, International Institute for Seoinformation Science and Earth Observation, 5 pages.

Scope Technologies; Solutions; Mar. 4, 2014; pp. 1-2, downloaded from the internet: [http://www.rnyscopetech.com/solutions.php].

Wang, et al.; Large-Scale Urban Modeling by Combining Ground Level Panoramic and Aerial Imagery; IEEE Third nlemalional Symposium on 3D Data Processing, Visualization, and Transmission; Jun. 14-16, 2006; pp. 806-813.

SketchUp Knowledge Base, Tape Measure Tool: Scaling an entire model, http://help.skelchup.com/en/article/95006, J013 Trimble Navigation Limited, 2 pages.

(56) References Cited

OTHER PUBLICATIONS

Vosselman et al., "3D Building Model Reconstruction From Point Clouds and Ground Plans," Oct. 2001, Natural Resources Canada, vol. 34, No. 3/W4 pp. 37-44.
Scale Area Measurement; (n.d). Retrieved from http://www.geog.ucsb.edu/-jeff/115a/lectures/scale_and_area_measuremenl.hlml, 8 pages.

* cited by examiner

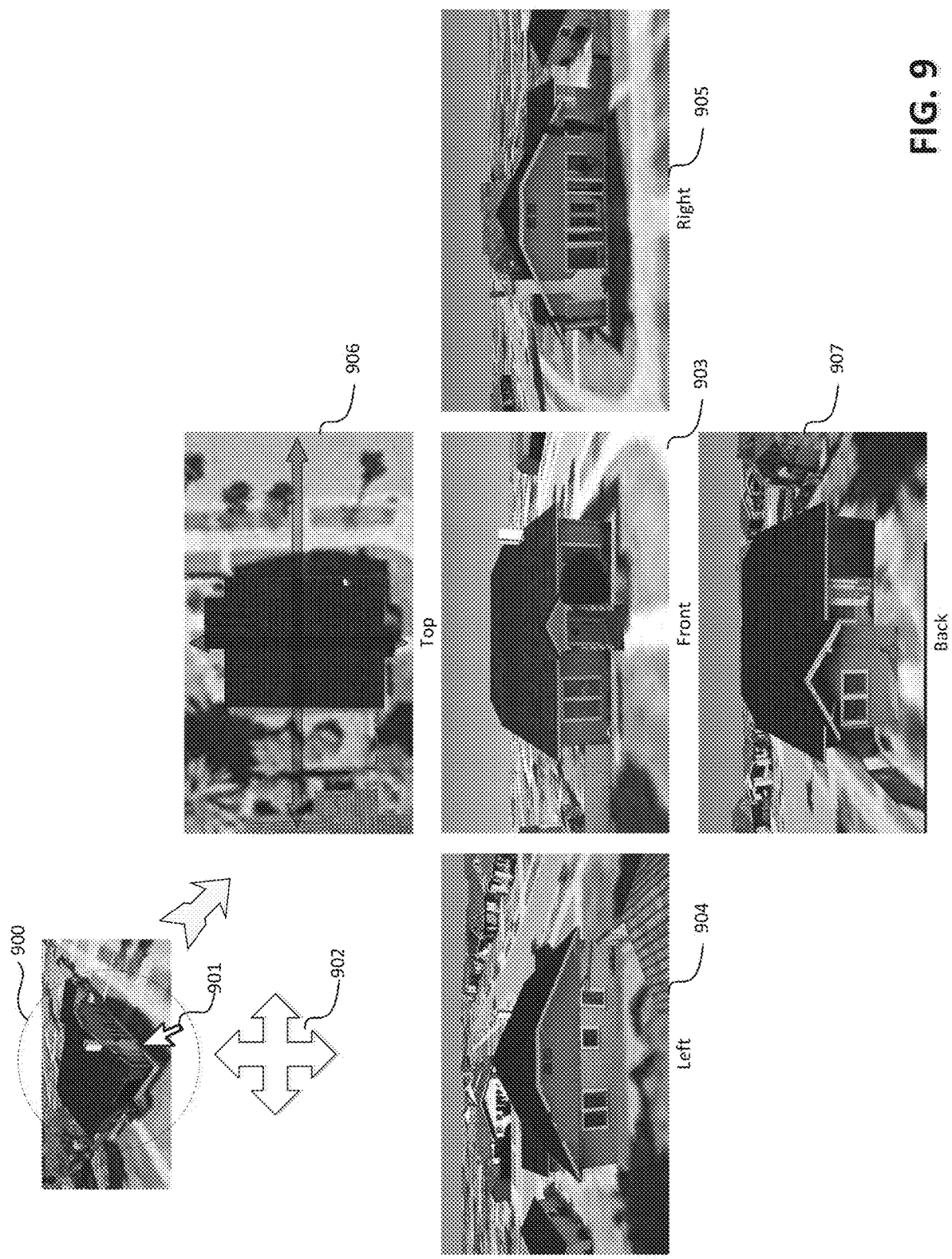

METHOD AND SYSTEM FOR DISPLAYING AND NAVIGATING AN OPTIMAL MULTI-DIMENSIONAL BUILDING MODEL

CROSS-REFERENCE TO RELATED APPLICATIONS/INCORPORATION BY REFERENCE

The present U.S. Utility Patent Application claims priority pursuant to 35 U.S.C. § 120 as a continuation of U.S. Utility application Ser. No. 16/848,844, entitled, "METHOD AND SYSTEM FOR DISPLAYING AND NAVIGATING AN OPTIMAL MULTI-DIMENSIONAL BUILDING MODEL," which is a continuation of U.S. Utility application Ser. No. 16/186,163, entitled, "METHOD AND SYSTEM FOR DISPLAYING AND NAVIGATING BUILDING FACADES IN A THREE-DIMENSIONAL MAPPING SYSTEM," which is a continuation of U.S. Utility application Ser. No. 15/721,062, entitled "METHOD AND SYSTEM for DISPLAYING AND NAVIGATING AN OPTIMAL MULTI-DIMENSIONAL BUILDING MODEL," filed Sep. 29, 2017, scheduled to issue as U.S. Pat. No. 10,127,721 on Nov. 13, 2018, which is a continuation-in-part of U.S. Utility application Ser. No. 15/255,952, entitled "METHOD AND SYSTEM FOR DISPLAYING AND NAVIGATING BUILDING FACADES IN A THREE-DIMENSIONAL MAPPING SYSTEM," filed Sep. 2, 2016, which is a continuation of Utility application Ser. No. 14/339,992, entitled "METHOD AND SYSTEM FOR DISPLAYING AND NAVIGATING BUILDING FACADES IN A THREE-DIMENSIONAL MAPPING SYSTEM," filed Jul. 24, 2014, now U.S. Pat. No. 9,437,044 on Sep. 6, 2016, which claims priority pursuant to 35 U.S.C. § 119(e) to U.S. Provisional Application No. 61/858,241, entitled "METHOD AND SYSTEM FOR DISPLAYING AND NAVIGATING BUILDING FACADES IN A THREE-DIMENSIONAL MAPPING SYSTEM," filed Jul. 25, 2013, all of which are hereby incorporated herein by reference in their entirety and made part of the present U.S. Utility Patent Application for all purposes.

The present Application is related to the following:
1. U.S. Utility application Ser. No. 13/624,816, entitled, "THREE-DIMENSIONAL MAP SYSTEM," filed on Sep. 21, 2012, now U.S. Pat. No. 8,878,865 and
2. U.S. Utility application Ser. Nos. 12/265,656, 12/265,656, entitled "METHOD AND SYSTEM FOR GEOMETRY EXTRACTION, 3D VISUALIZATION AND ANALYSIS USING ARBITRARY OBLIQUE IMAGERY," filed Nov. 5, 2008, now U.S. Pat. No. 8,422,825.

BACKGROUND

Technical Field

The technology described herein relates generally to an interactive three-dimensional (3D) map system and, in particular, to a system and method for visualizing 3D building models within an interactive 3D building model visualization system.

Location-based and mobile technologies are often considered the center of the technology revolution of this century. Essential to these are ways to best present location-based information to electronic devices, particularly mobile devices. The technology used to represent this information has traditionally been based on a two-dimensional (2D) map.

Efforts have been made to generate a three-dimensional (3D) map of urban cities via aerial imagery or specialized camera-equipped vehicles. 2D maps presenting street level photographs as well as 3D maps displaying 3D building models have emerged as alternatives to classical 2D maps. However, these 2D or 3D maps have limited texture resolution and geometry quality, and do not allow users to display the highest quality, optimal views of selected building models on a map. These efforts also do not integrate street-level imagery into a full 3D scene as they require dual data interfaces between aerial-derived 3D datasets and a disorienting transition to static panoramic street-level imagery, typically collected using vehicles. Ways of resolving these problems have been sought by those in the art, but prior developments have not taught or suggested any viable solutions.

BRIEF DESCRIPTION OF THE DRAWINGS

FIG. 9 illustrates an embodiment for displaying and navigating a 3D building model visualization system in accordance with the present disclosure.

DETAILED DESCRIPTION

One or more embodiments of the technology described herein include a method and system for visualizing and navigating 3D building models. Optimal views of the facades (sides) of 3D building models are automatically generated for display. In another embodiment, the system and method provides for navigation through a 3D map system using one or more optimal views of facades.

Figure 1:
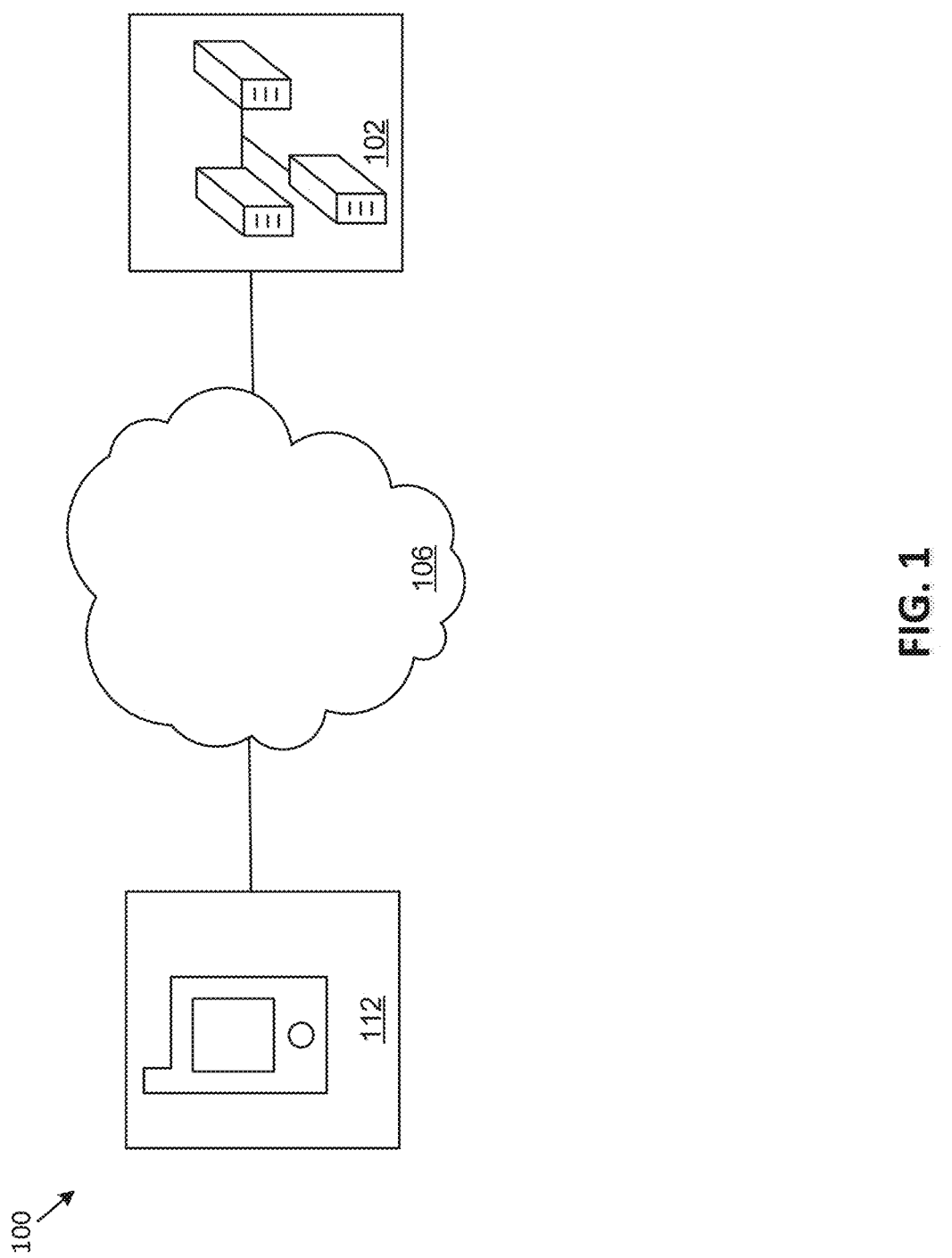
FIG. 1 illustrates one embodiment of a system for generating an optimal view of a 3D building model in accordance with the present disclosure.

FIG. 1 illustrates one embodiment of a system for generating an optimal view of a 3D building model in accordance with the present disclosure. In one embodiment, 3D building model visualization system 100 includes view processing system 102 and electronic device 104 coupled via a network channel 106. Network channel 106 is a system for communication. Network channel 106 includes, for example, an Ethernet or other wire-based network or a wireless network or wireless adapter for communicating with a wireless network, such as a WI-FI network. In other embodiments, network channel 106 includes any suitable network for any suitable communication interface. As an example and not by way of limitation, network channel 106 can include an ad hoc network, a personal area network (PAN), a local area network (LAN), a wide area network (WAN), a metropolitan area network (MAN), or one or more portions of the Internet, cloud based systems or a combination of two or more of these. One or more portions of one or more of these networks may be wired or wireless. As another example, network channel 106 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, network channel 106 uses standard communications technologies and/or protocols. Thus, network channel 106 can include links using technologies such as Ethernet, 802.11, worldwide interoperability for microwave access (WiMAX), 3G, 4G, LTE, CDMA, digital subscriber line (DSL), etc. Similarly, the networking protocols used on network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, the data exchanged over network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

Electronic device 104 is a device for selection and display of a 3D building model. For example, electronic device 104 is a computer with a monitor, a laptop, a touch screen display, a smartphone, tablet computer, an LED array, game console, a television set, a projector display, a wearable heads-up display of some sort, or any combination thereof. In one embodiment, electronic device 104 includes a computer system, such as computer system 200 of FIG. 2, for processing 3D visual data for display.

In one embodiment, view processing system 102 collects building selection information (e.g., address, geo-location, position or areas within a displayed map, etc.) corresponding to a selected 3D building model from electronic device 104. In some embodiments, electronic device 104 directly uploads selection information to view processing system 102 via the network channel 106, or indirectly uploads the information. For example, the information is uploaded to a computer or a server first before being uploaded to view processing system 102. For another example, the information is transferred from electronic device 104 to a networked computer, and then the information is transferred to the view processing system 102.

Figure 2:
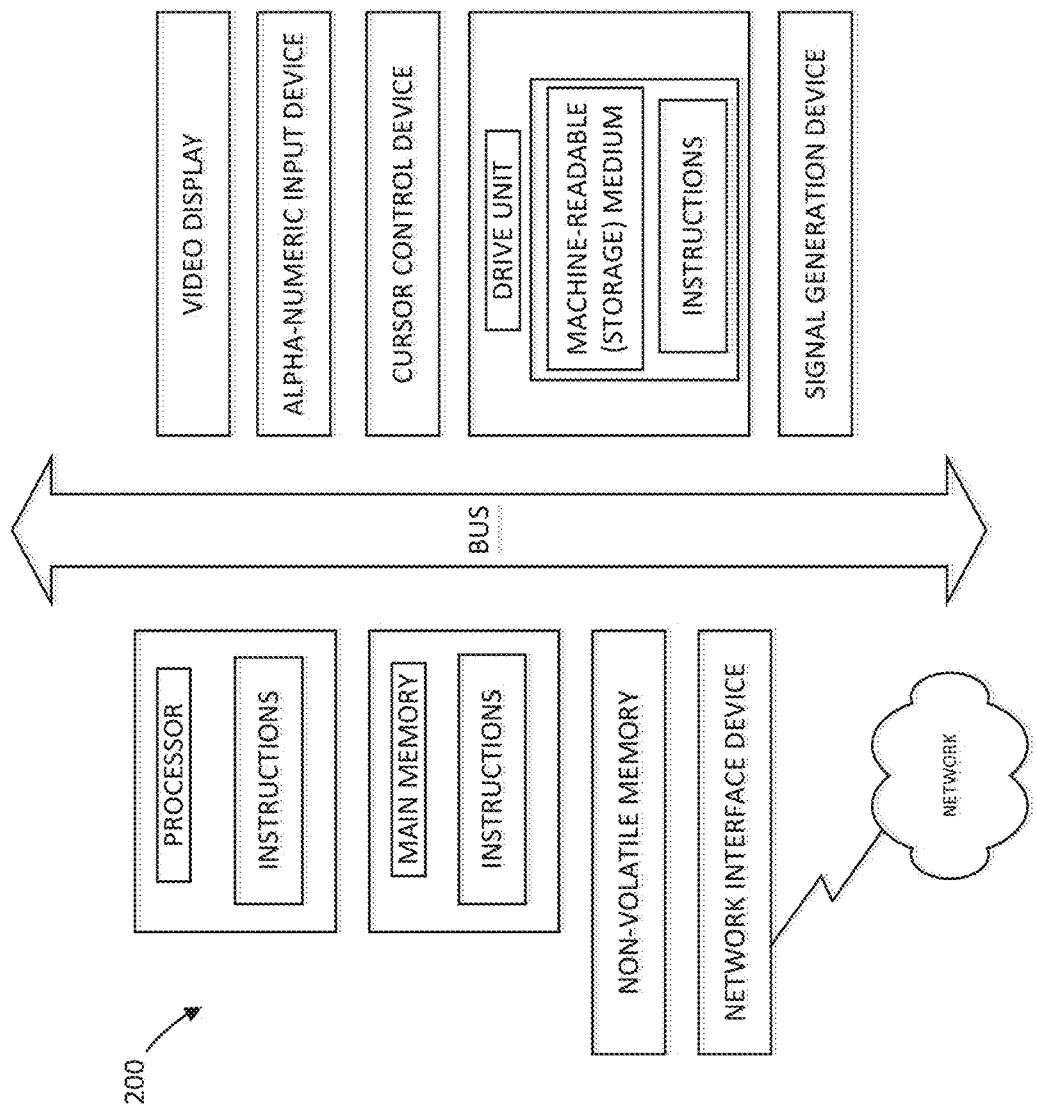
FIG. 2 illustrates a diagrammatic representation of a machine in the example form of a computer system in accordance with the present disclosure.

FIG. 2 illustrates a diagrammatic representation of a computer system m accordance with the present disclosure. In one embodiment, computer system 200 includes a machine and a set of instructions for causing the machine to perform any one or more of the methodologies or modules discussed herein. Computer system 200 includes a processor, memory, non-volatile memory, and an interface device. Various common components (e.g., cache memory) are omitted for illustrative simplicity. The computer system 200 is intended to illustrate a hardware device on which any of the components depicted in the example of FIGS. 1-2 (and any other components described in this specification) can be implemented. Computer system 200 can be of any applicable known or convenient type. The components of computer system 200 can be coupled together via a bus or through some other known or convenient device.

This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 200 may include one or more computer systems; be unitary or distributed; span multiple locations; span multiple machines; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in computer system 200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of computer system 200. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, computer system 200 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

According to one or more embodiments of the technology described herein, an "optimal view" of a 3D building model façade is defined as a preferred view of a 3D building model (e.g., elevated front view) which is generated by a 3D building model visualization system from a bird's eye view/perspective and which calculates and generates an unobstructed or a partially unobstructed view of a 3D building model or group of connected or close proximity (e.g., same city block) models. The generated view is provided to a computer system display as a centered image including at least one façade (side) of the 3D building model. The 3D building model refers to a textured 3D building model using known texturing techniques.

In one embodiment, the generated optimal view of the 3D building model includes visible buffer regions around the centered view of the building (top, bottom, left, right). In one or more embodiments, these buffer regions are white space around a selected 3D building object. In other embodiments, the buffer regions include elements of building models and/or other visible structures located in the vicinity of the selected building model(s) within the 3D map.

Figure 3A:
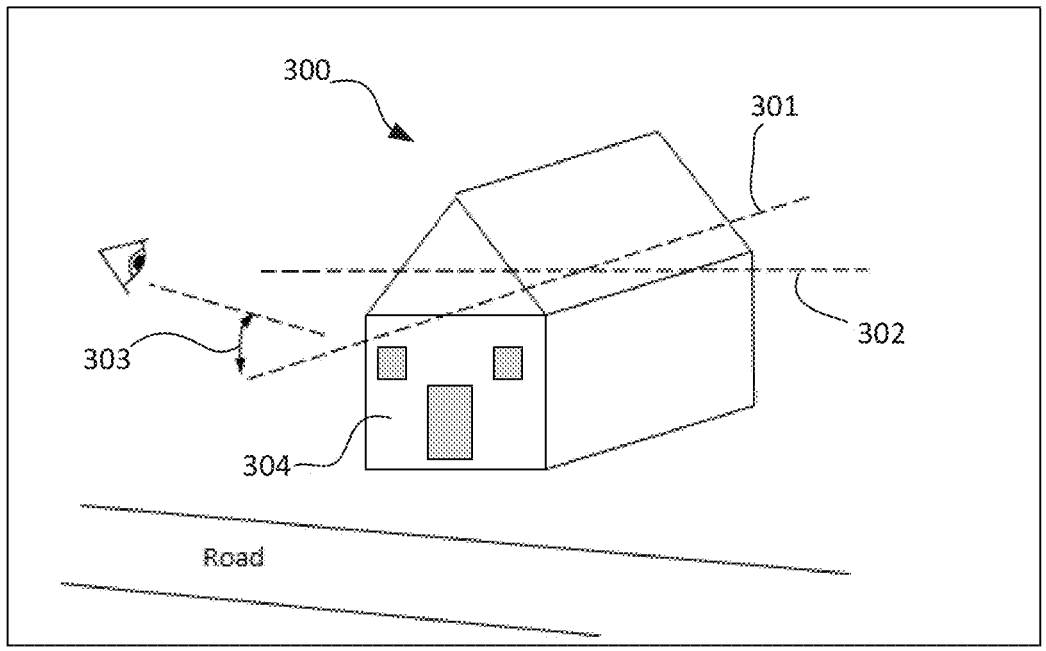
FIGS. 3A and 3B illustrate example embodiments of building models from a three-dimensional building model visualization system in accordance with the present disclosure.
Figure 3B:
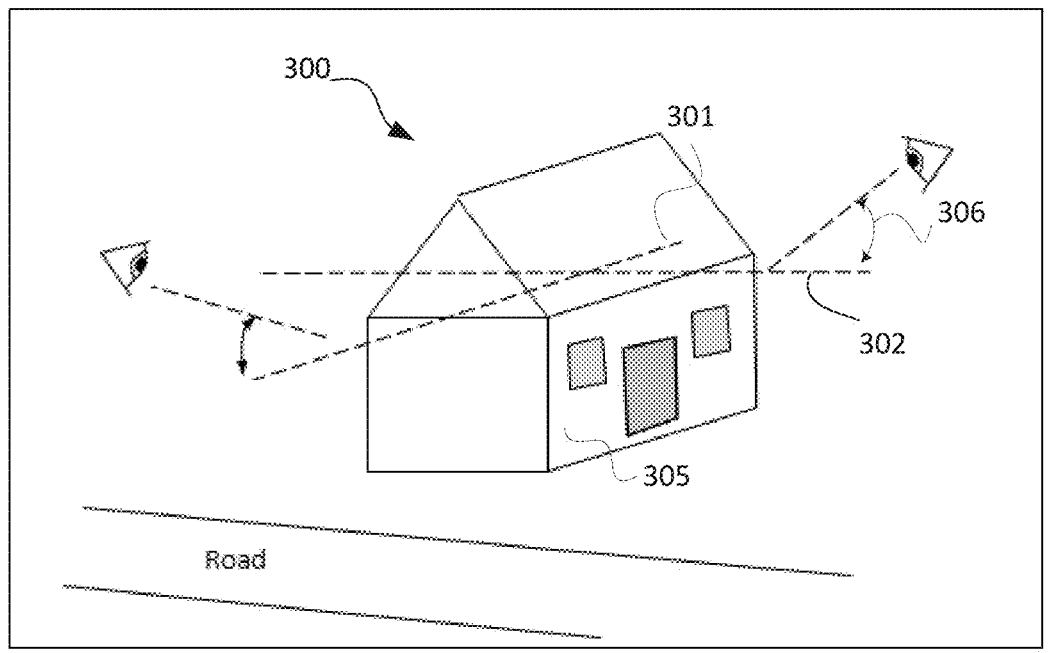

FIGS. 3A and 3B illustrate embodiments of 3D building models from the 3D building model visualization system in accordance with the present disclosure. FIG. 3A illustrates one embodiment of a building model where 3D building model 300 is selected to be displayed on electronic device 104 of FIG. 1. In one embodiment, the 3D building model is selected on the electronic device using current global positioning system (GPS) information. In alternative embodiments, building model 300 is selected by touching or clicking (e.g., using a mouse/stylus) on a location of a map on the display of electronic device 112 of FIG. 1 or typing in an address of the desired 3D building model.

In one embodiment, electronic device 104 displays a view of building model 300 in the form of a view of building model façade 304. First main axis 301 and second main axis 302 are calculated axes (e.g., following a primary roof line, for example a lengthwise building peak or orthogonal to the other axis) which define the orientation of the building model. As will be described in greater detail hereafter, the disclosed 3D building model visualization system, in accordance with the present disclosure, automatically calculates and/or pre-stores previously calculated optimal views for each façade of the selected or stored 3D building models. In one or more embodiments, an optimal view for building model façade 304 is calculated based on a defined look angle 303 with respect to calculated main axis 301 and a defined field of view (e.g., defined up/down, left/right angles which define the extent of what is viewed on a 3D map) for the selected building. The calculated optimal view is centered on the display screen. A buffer zone (e.g., white space or elements of surrounding model structures) around the façade of the building model is typically included in the displayed view for centering purposes. A primary optimal view is the optimal view which the 3D building model visualization system ranks as the highest quality optimal view available for display. In one or more embodiments, the primary optimal view is a view generated for the front façade of a 3D building model. A primary axis is a first main axis perpendicular to the side of the building model which is displayed in the calculated primary optimal view. In one embodiment, selection of a building model on a 3D map will result in the 3D building model visualization system calculating optimal views for all the sides of a building model and displaying only the primary optimal view of the building model. In other embodiment, the 3D building model visualization system will provide interface controls to select one or more of the calculated optimal views of the building model. In one embodiment, the building model façade 304 is facing a main road or street in the 3D building model visualization system and the primary optimal view (typically the front) is selected to be one of the optimal views which face a main street or road path 305 from the 3D building model visualization system.

FIG. 3B illustrates another embodiment of a building model from the 3D building model visualization system in accordance with the present disclosure. In one embodiment, building model 300 has a primary optimal view selected on side 307 of the 3D building model which is not facing a road. The optimal view is calculated and displayed based on a defined look angle 306 and second main axis 302. In one embodiment, machine learning capable algorithms are used to identify and determine a selected 3D building model's architectural features (e.g., windows, bay windows, doors, columns, railings, etc.) and rank the various facades of a selected 3D building model based on expected architectural features typically located on primary facades (e.g., centered front door, portico, porch, high number of windows, etc.). In additional embodiments, known neural networks or statistics such as archetypal analysis on buildings or imagery are used to determine a pattern as to what feature combinations and layouts generally constitute the primary optimal view of a building model within the 3D building model visualization system.

In one or more embodiments, optimal views and navigation within the 3D building model visualization system are achieved through pre-calculated, stored building model views and interbuilding navigation routes (e.g. roads, intersections, etc.). As the 3D map system is navigated, stored calculated optimal views of the building models are displayed. The 3D mapping system routes and views are then navigated in an object-oriented, spatially intuitive (e.g., up, down, left, right) manner. The system simplifies industry common 3D navigational approaches typically referred to as "six degrees of freedom" methods that require fine motor adjustments that are not experienced in navigating a 3D mapping system. In other words, the navigator can navigate in 3D by sequencing through optimal views of one or more building models rather than trying to navigate in three dimensions using, for example, a 3D mouse or joystick.

Figure 4:
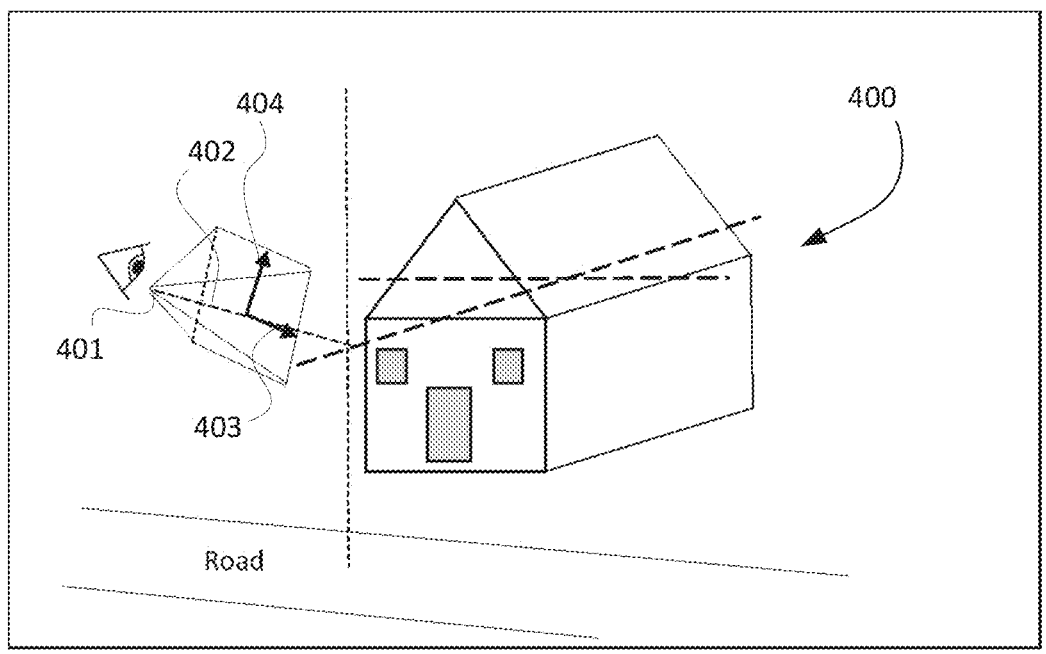
FIG. 4 illustrates an example embodiment of calculating a camera position for a 3D building model in accordance with the present disclosure.

FIG. 4 illustrates an example embodiment of calculating a camera position for a 3D building model in accordance with the present disclosure. In one embodiment, camera position 401 is arranged for generating optimal views for one or multiple building models 400 in a 3D building model visualization system. In one embodiment, projection pyramid 401 having forward direction vector 402, right vector 403 and up vector 404 projecting from the camera point are used to calculate a camera position. Additional details for calculating a camera position are discussed in FIG. 6.

Figure 5:
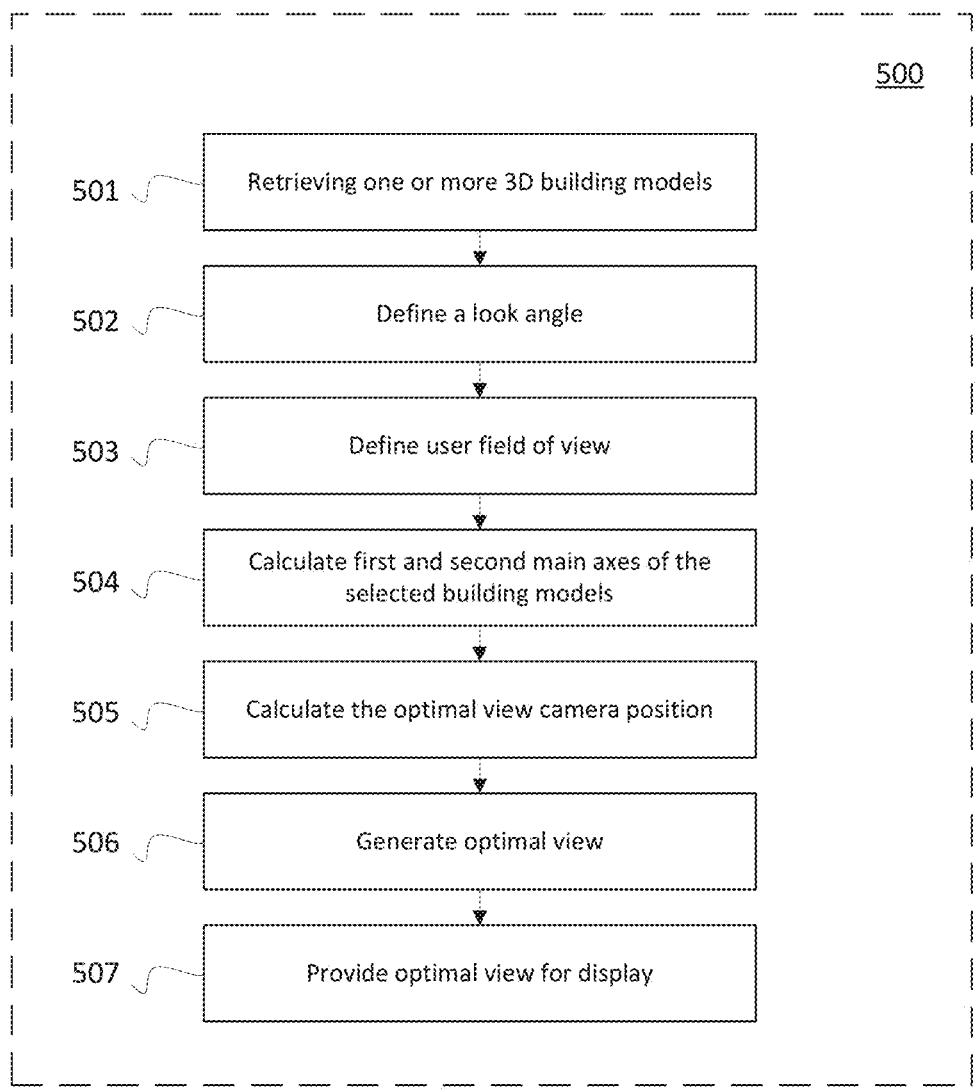
FIG. 5 illustrates a flowchart embodiment of a process for generating optimal views of selected building models in accordance with the present disclosure.

FIG. 5 illustrates an embodiment of a flowchart of the process for generating optimal views of selected 3D building models in accordance with the present disclosure. Process 500 is initiated when one or more 3D building models are retrieved from the 3D building model visualization system (step 501) based on a selected building location. As previously stated, the location is selected using current global positioning system (GPS) information (e.g., a user is standing in front of a building of interest), by touching or clicking on a location of a map, or typing in an address of the desired 3D building model. In one embodiment, the 3D building models for the selected location are retrieved from the 3D map system.

In a next step, an optimal look angle (downward pitch angle) is defined (step 502) for the selected 3D building model. In one embodiment an optimal look angle, as depicted in FIGS. 3A-3B (303/306) is set as a default downward pitch angle relative to the calculated axis by the 3D building model visualization system (e.g., 10-50 degrees). For example, in one embodiment an optimal look angle is selected at or proximate to 20 degrees. In alternative embodiments, the optimal look angle is defined to limit obstructions from the view of the 3D building model facades. For example, if a tall structure is in the line of site of the optimal view, the look angle can be raised to look over the obstruction.

In one embodiment, defining a look angle is determined largely by where and how the images are taken during capture. Contextual (e.g., telemetric) information about this capture is written into an EXIF for the image. EXIF—exchangeable image file format is a standard that specifies formats for images, sound, and ancillary tags used by digital cameras (including smartphones, drones, etc.). The contextual information is included with each image via an EXIF tag or separately via a metadata file. The image metadata (contextual information) includes, but is not limited to:

GPS Latitude Ref
GPS Longitude Ref GPS Altitude
GPS Dilution of Precision
GPS Img (image) Direction Ref (reference)
GPS Img (image) Direction
Additional metadata for gravity, camera orientation and image capture sequence number.

For example,
{"device_orientation":3,"gravity":
{"x":−0.07310568541288376,"y":−0.8332936763763428,"z":0.5479755997657776},
"hover_cube_face":3,"version":"3.1.43"}
Image naming convention.
For example.
84463244-6c58-4422-8389-d6991748ee05_3.jpg The sequence number effectively describes and associates each image with a virtual location. For example, the user is directed to start image capture at a front door, go counterclockwise to front right corner, right side, back left corner, back side, back right corner, side, front left corner in the image capture sequence and a name is associated with the images with this sequence. If any of the camera sequence needs to be retaken (e.g., loss of image, bad imagery, etc.), the system preserves the sequence number and increments the retry number, for example "84463244-6c58-4422-8389-d6991748ee05_3_1.jpg", implies image three in the sequence was retried once.

The GPS indicates an exact location of the camera during capture for each image. The azimuth tells us the direction in which the camera is pointed with reference to magnetic or true north. Gravity and device orientation provides information on a relative orientation of the camera in image or world co-ordinate systems. The camera level, horizon, etc. allow the system to precisely locate the camera in 3D space for each image. Additionally, this provides, in one embodiment, an option to plot the default look angles for the resulting 3D model based on the initial camera positions. For example, the first look angle is typically established with reference to sequence 1 in the capture.

Some other factors that affect how the look angles are established involve the type of 3D model reconstruction:

if the 3D model caters to roof only geometries, the look angles are established at an arbitrary height to the roof of the building, instead of being at ground level;

if the 3D model is a full building reconstruction, the system may establish the look angle starting with a corner, for example, the typical location of the second image in the sequence;

if the user is interested in visualizing doors in house, the look angles are established starting with the first camera position at the front of the door and plotted in sequence next to different door geometries in sequence (or any other desired architecture feature, e.g., windows, dormers, etc.). For example, if the user is interested in visualizing siding, the look angles may be established starting with side number one, or camera image 1; or if the imagery is all captured at a specific altitude, for example from a drone, the look angles may be established at a specific altitude over the 3D model to provide this perspective by default.

In one embodiment, user or model creation algorithms can manually locate the look angles after the 3D model is defined by moving the model in 3D space and labelling locations within that space. Some reasons for this could be that some parts of the 3D model were not fully modeled due to factors like lack of adequate imagery, known obstructions, etc. Also, for visualizations purposes some angles may not be useful for the viewer, for example the side of the building facing a hill side.

In one embodiment of capture sequencing, arbitrary factors are used to locate the image capture as it depends on local building constraints. For example, if there is an obstruction from a tree or another structure, the system can direct the user of the camera to reposition the camera for the next image. In another example, if the camera is too close to the building, i.e., the top, bottom, and/or end points are not within a frame of the camera, the system can direct the user of the camera to reposition the camera further back from the same relative position. Any repositioning direction is envisioned within the scope of the present technical description to assist in establishing look angles for a resulting 3D model.

A field of view (extent of the observable view) is set in the next step (503) once the optimal look angle for the selected 3D building model is defined. The field of view represents the selected 3D building model including its surrounding area. For example, the field of view may include several feet of surroundings in the front of the 3D building model, the sides of the 3D building model or above the 3D building model. In one embodiment, the field of view is defined manually by selection of a boundary for a selected 3D building object. In certain embodiments, the 3D building model visualization system defines the field of view automatically, using computer vision algorithms to account for road networks in the vicinity of the selected 3D building model, obstructions from other buildings or structures, relevant faces of the building models, or any other structures or map elements which suggests an initial optimal field of view. In yet other embodiments, the 3D building model visualization system provides a default field of view which includes fixed up/down angles (typically 45 degrees) and or left/right angles.

The first (primary) and second (perpendicular) axes of the selected building models are calculated by the system (step 504) in the next step. In one embodiment, angular thresholds are used to establish groups of like angles and identify the edges of the structure (e.g., 3D building model) in order to determine four sides as well as the orientation of a first optimal view. In this exemplary embodiment, a first edge becomes an initial grouping plane location. As edges are added to a specific grouping, a weighted edge length is generated that represents a new edge length raised to the power of the influence value. In one embodiment the value of the influence value is 3. In other embodiments, if the influence value is zero, then a main axis is calculated as the average of all of the edge orientations with the angular threshold regardless of their length. The larger that this value is, the more that longer edges and less that shorter edges have influence over the estimate of the axis going through the edges. A weighted edge plane is generated for each edge that is the distance of the new edge from the initial edge plane multiplied by the grouping plane normal minus the initial edge plane multiplied by the weighted edge length. The weighted length sum is maintained as the sum of the weighted edge lengths. The sum of the weighted edge planes is maintained. The grouping plane that the edges are adjusted to is maintained as the sum of the weighted edge planes divided by the weighted length sum. While this method of establishing groups of like angles reflects an exemplary embodiment, other methods of recognizing like angles are envisioned without departing from the scope of the technology described herein.

In a next step, a camera position is calculated (step 505). The method of calculating the camera position is discussed with respect to FIG. 6 below. In a final step, an optimal view of the selected 3D building model is generated (step 506) by a 3D building model visualization system according to the process and is communicated to the electronic device for display (step 507).

Figure 6:
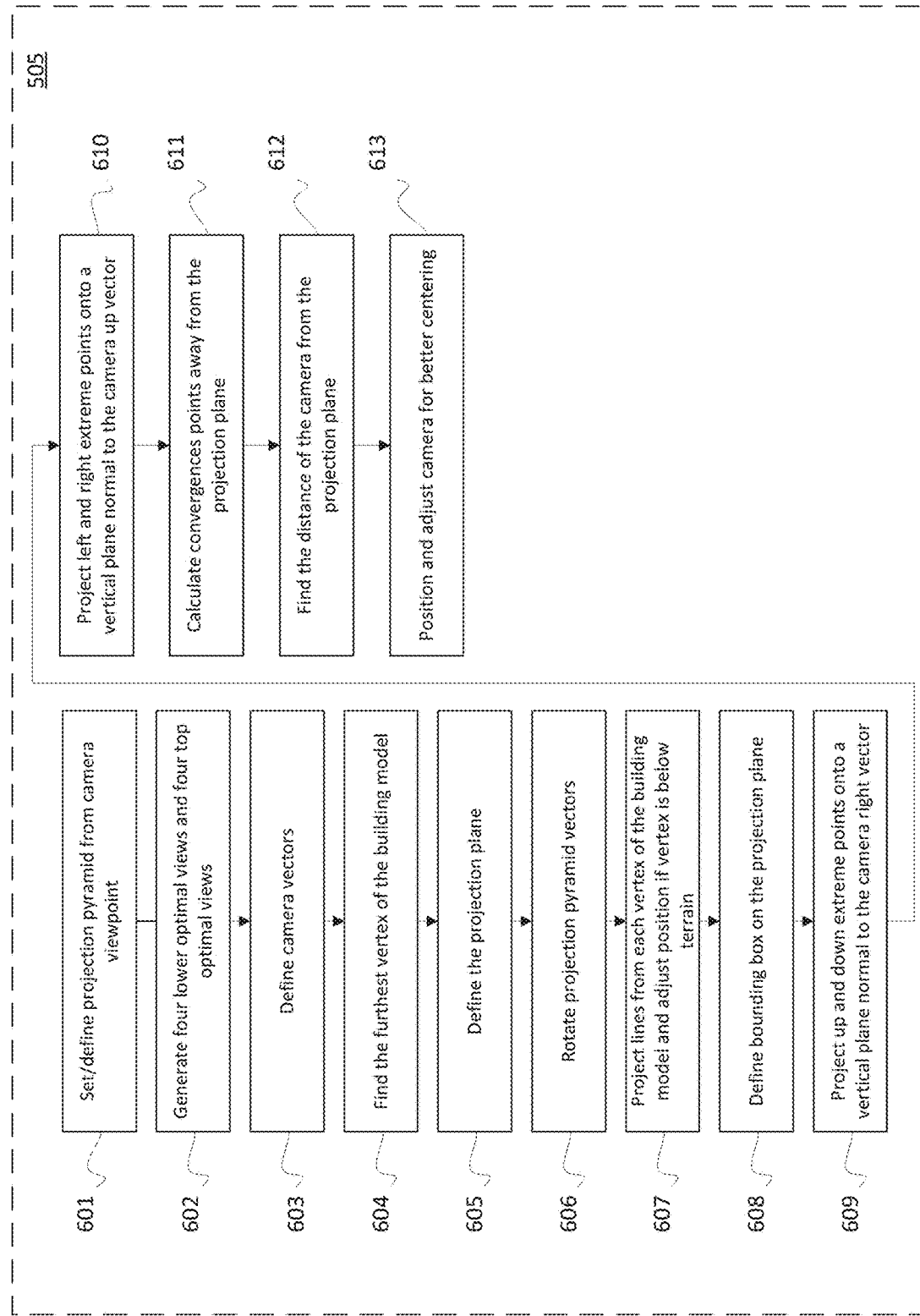
FIG. 6 illustrates a flowchart of an exemplary embodiment for calculating a camera position in accordance with the present disclosure.

FIG. 6 illustrates a flowchart of an exemplary embodiment for calculating a camera position in accordance with the present disclosure. The process involves calculating the camera position as discussed in block 505 of FIG. 5. In a first step, a projection pyramid 501 as shown in FIG. 4 projecting from the camera is defined (step 601). In one embodiment, a projection pyramid projecting from the camera point is defined manually. Yet in other embodiments, the projection pyramid projecting 401 from the camera point is set automatically by 3D building model visualization system. An offset angle up and down from forward direction vector 402 for the camera are equal, and the offset angles left and right of the forward direction vector 402 are equal. The offset angles are smaller than the defined field of view established in process 500 of FIG. 5. In one or more embodiments, by default, the up and down offset angles from forward direction vector 402 are set to 20 degrees to give a 2.5 degrees vector up and down. The left and right offset angles are adjusted based on the aspect ratio of the viewer window. In one embodiment, the corner vectors defining the up-right, down-right, down-left, and up-left edges projecting from camera, as well as side vectors defining projections along the center-right, center-down, center-left, and center-up are stored by the 3D building model visualization system. In another embodiment, the side vectors defining projections along the center-right, center-down, center-left, and center-up are stored by the 3D building model visualization system.

In a next step, lower optimal views and top optimal views are generated for each selected 3D building model (step 602). In an example embodiment, at least one for the positive direction of each axis and at least one for the negative direction of each axis (the primary axis and perpendicular axis) providing four lower optimal views and four top optimal views.

In another step, to define the camera vectors (step 603), the system determines and calculates the forward direction vector as well as right and up camera vectors. The forward camera direction for lower optimal views is calculated as being in the same vertical plane of the calculated axis and using the defined downward pitch angle. The right vector 403, which will be parallel to the right direction of a display, is calculated as being 90 degrees clockwise to the forward camera direction vector and horizontal. The up vector 404, which will be parallel to the up direction of the viewer screen, is calculated as being rotated 90 degrees up from the forward direction vector and also as being in the same vertical plane of the calculated axis.

In a next step (step 604), the vertex in the building model structure selection that is furthest forward along the camera forward direction vector 402 is found and a projection plane (not shown) is defined as being normal or perpendicular to the camera forward direction vector and going through the vertex that is furthest forward along the camera forward direction vector (step 605).

In one embodiment, the projection pyramid vectors are rotated (step 606) so that the camera forward direction vector is centered between the up/down and left/right sides and between the vectors that define the pyramid. In another embodiment, the projection pyramid vectors are rotated so that the camera forward direction vector is centered between the up/down and left/right sides that define the pyramid.

In one embodiment, in a next step (step 607), for each vertex in the 3D building model structure selection, lines are projected from the vertex in the direction of each corner pyramid vector are intersected with the projection plane. In one embodiment, if the vertex is below the terrain, the vertex location is snapped vertically to the terrain height, and that position is used instead. In another embodiment, for each vertex in the building model structure selection, lines are projected from the vertex in the direction of each side pyramid vector are intersected with the projection plane. In certain embodiments, if the vertex is below the terrain, the vertex location is snapped vertically to the terrain height, and that position is used as the intersection point instead.

In a next step (step 608), the minimum and maximum distances of the intersection points along the camera up and camera right direction vectors from a reference point on the projection plane are stored along with the vertices that the projection points came from. These distances define a bounding box on the projection plane around the vertex line intersections.

The up and down extreme points are then projected onto a vertical plane normal or perpendicular to the camera right vector while the left and right extreme points are projected onto a plane normal or perpendicular to the camera up vector (blocks 609 and 610).

Convergence points away (back) from the projection plane are then calculated (step 611) in two stages. In a first stage, a convergence point away from the top and bottom edges of the bounding box is calculated according to the following steps. In a first step, the normal of the top surface of the projection pyramid is calculated as the cross product of the camera right vector and the projection pyramid center-up direction vector. In a second step, a convergence plane is defined as the plane that has a normal the same as the top surface of the projection pyramid and going through the vertex with highest intersection on the projection plane. In a third step, a convergence line is defined as the line with the direction the same as the projection pyramid center-down direction vector and going through the vertex with the lowest intersection on the projection plane. In a final step, the intersection between the convergence plane and the convergence line produces the up/down convergence point.

In a second stage, a convergence point away from the left and right edges of the bounding box is calculated according to the following steps. In a first step, the normal of the right surface of the projection pyramid is calculated as the cross product of the camera up vector and the projection pyramid center-right direction vector. In a second step, a convergence plane is defined as the plane that has a normal the same as the right surface of the projection pyramid and going through the vertex with furthest right intersection on the projection plane. In a third step, a convergence line is defined as the line with the direction the same as the projection pyramid center-left direction vector and going through the vertex with the furthest left intersection on the projection plane. In a fourth step, the intersection between the convergence plane and the convergence line to get the left/right convergence point.

The distance of the camera from the projection plane is found next (step 612) by measuring the distance between the up/down convergence point and the projection plane and the distance between the left/right convergence point and the projection plane. The camera is positioned back from the center of the projection plane bounding box at the largest convergence point distance from the projection plane.

In one or more embodiments, the camera position is adjusted for better centering (step 613). If the up/down convergence distance from the projection plane is shorter than the left/right convergence distance, the calculations can be iterated with smaller up/down offset angles from the forward vector until the up/down convergence distance substantially matches the left/right convergence distance. If the left/right convergence distance from the projection plane is shorter than the up/down convergence distance, the calculations can be iterated with smaller left/right offset angles from the forward vector until the left/right convergence distance substantially matches the up/down convergence distance.

Figure 7A:
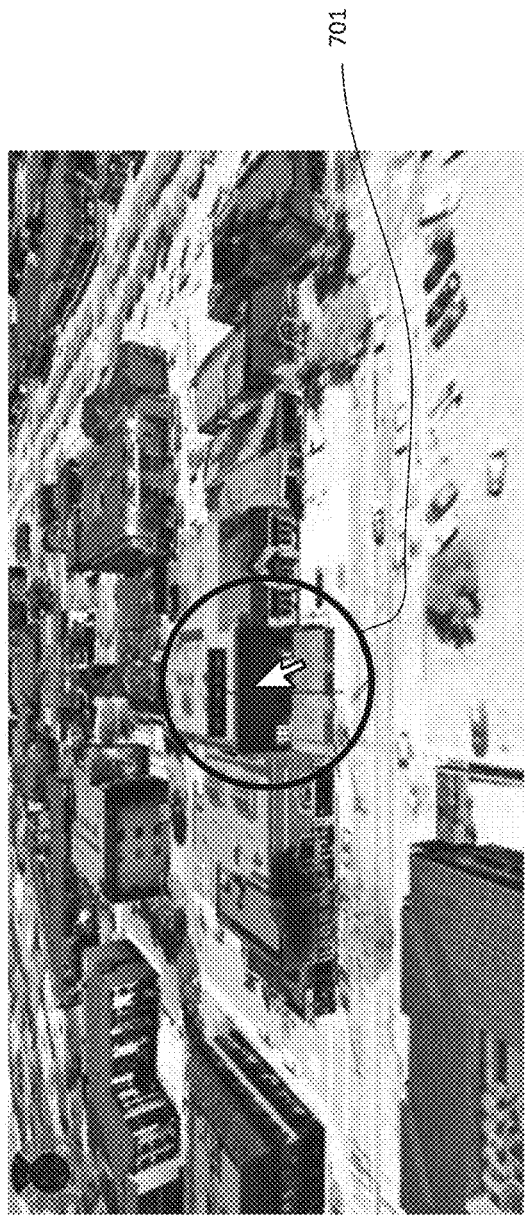
FIGS. 7A-7B collectively illustrate examples of optimal views for 3D building models in a 3D building model visualization system in accordance with the present disclosure.
Figure 7B:
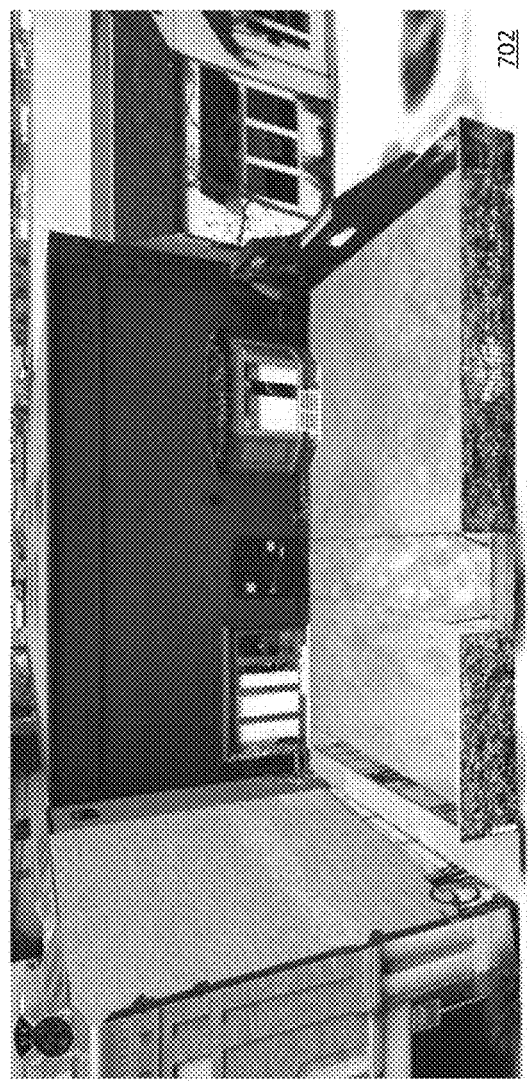

FIGS. 7A and 7B illustrate examples of optimal views for 3D building models in the 3D building model visualization system in accordance with the present disclosure. FIG. 7A illustrates a screen-shot of multiple building models on a street within the disclosed 3D building model visualization system. In one embodiment, one or more building models 701 are selected, for example, by typing in the exact address of a building model on the map. In one embodiment the address is entered in the 3D building model visualization system in the form of a mailing address, GPS/geographical coordinates of the building, or as a point of interest. In other embodiments, the 3D building model is selected by clicking on it with a computer mouse, joystick or the like. The typing of the address may be done using known computer keyboard devices, voice or hand waving commands or any other known and available technology of typing data into the system. In other embodiments, the building model is selected within the interface by touching or swiping on a touch-screen display or a capacitive screen display (e.g., using a finger, stylus or the like). In one embodiment, upon selection of a 3D building model (e.g., structure or object), the 3D building model visualization system calculates or retrieves a pre-calculated primary optimum view 702 of the building model as shown in FIG. 7B.

Figure 8:
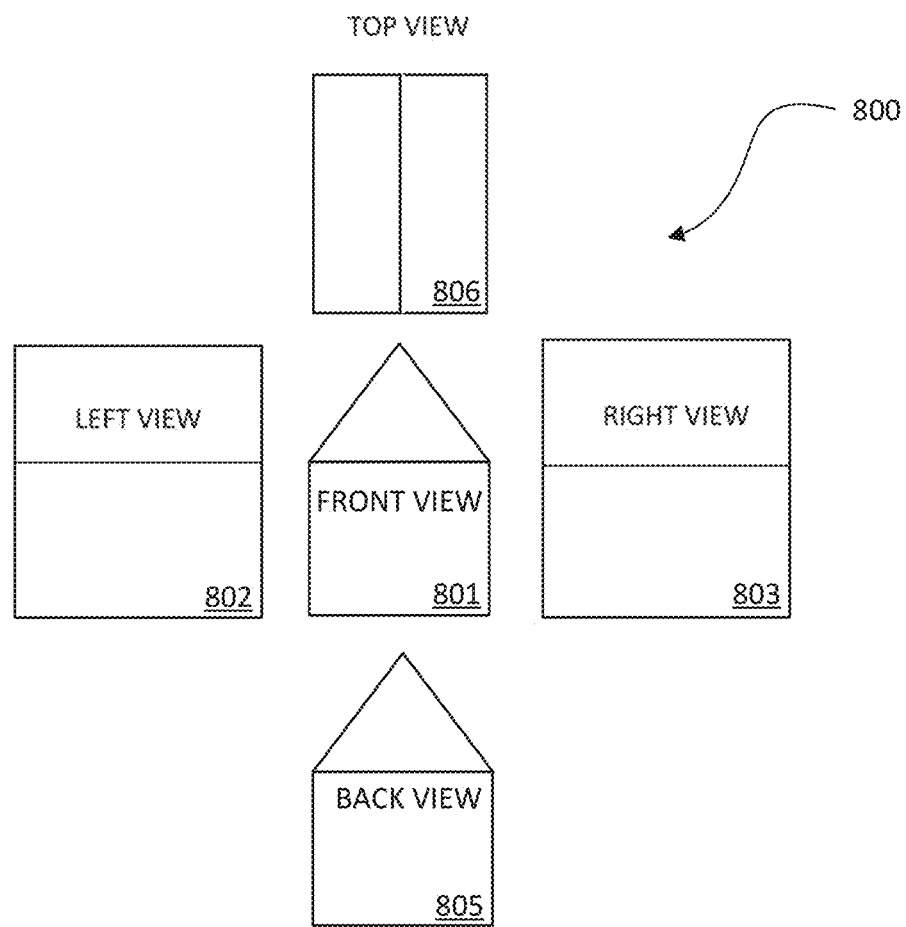
FIG. 8 illustrates a general schematic of a multiple view building model m accordance with the present disclosure.

FIG. 8 illustrates a general schematic of an embodiment in accordance with the present disclosure. In one embodiment, the 3D building model visualization system displays the optimal views for a selected 3D building model. Instead of a single view (e.g., the primary optimal view), the 3D building model visualization system displays optimum views 801 through 805 of the building model's facades. Each of the displayed views are optimal views (e.g., views corresponding to downwards look angles as depicted in FIGS. 3A and 3B).

FIG. 9 illustrates an embodiment for displaying and navigating a 3D building model visualization system in accordance with the present disclosure. In a first embodiment, selection of a building model 900 from the 3D building model visualization system automatically generates and displays optimal views of the building model as fixed perspective views (e.g., front, left, right, top, rear and bottom). While a mouse cursor 901 was used in this figure to show selection of a building model in the 3D building model visualization system, any other known selection devices and methods are also contemplated. Selection of a building model by joy-stick, game controller, touching a touch sensitive screen, typing an address or geographic coordinates, automatic selection using a location, or by using voice commands, eye gazing or hand waving commands produce the same results. Interface navigation controls 902 (e.g., up, left, right and down arrows) allow for visualization of a building model and/or navigate in the 3D building model visualization system through fixed, optimal perspectives views 903 through 907 of the building model 900, simplifying the traditional "six degrees of freedom" fine motor adjustments.

Throughout the specification, drawings and claims various terminology is used to describe the various embodiments. As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, measurements, angles, positions and geo-locations. Such relativity between items ranges from a difference of a few percent to magnitude differences.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. For example, the steps may be completed in varied sequences to complete the textured facades. The technology as described herein is not limited by the particular examples disclosed herein and expressly incorporates these other combinations.

The invention claimed is:

1. A method of visualizing three dimensional content, the method comprising:
    receiving a three dimensional (3D) building model;
    calculating a first main axis and a second main axis of the 3D building model to define an orientation of the 3D building model, wherein the second main axis is perpendicular to the first main axis;
    defining a look angle for the 3D building model;
    determining architectural features of the 3D building model;
    calculating an optimal virtual camera position for the 3D building model based on the defined look angle, the orientation of the 3D building model, and the determined architectural features, the optimal virtual camera position defining an optimal view of the 3D building model;
    generating the optimal view of the 3D building model from the optimal virtual camera position; and
    displaying the optimal view of the 3D building model.

2. The method of claim 1, wherein calculating the first main axis comprises grouping lines of the 3D building model within an angular threshold of one another and selecting the group with the largest sum of weighted edge length for the grouped lines.

3. The method of claim 1, wherein defining the look angle comprises defining the look angle for each of at least two planar geometries of the 3D building model.

4. The method of claim 1, wherein determining the architectural features comprises:
    identifying the architectural features of the 3D building model; and
    ranking the identified architectural features.

5. The method of claim 4, wherein calculating the optimal virtual camera position is further based on the ranked architectural features.

6. The method of claim 1, wherein calculating the optimal virtual camera position is further based on combinations of the architectural features and layouts of the architectural features.

7. One or more non-transitory computer-readable media storing instructions that, when executed by a system comprising one or more processors, cause the one or more processors to perform operations comprising:
    receiving a three dimensional (3D) building model;
    calculating a first main axis and a second main axis of the 3D building model to define an orientation of the 3D building model, wherein the second main axis is perpendicular to the first main axis;
    defining a look angle for the 3D building model;
    determining architectural features of the 3D building model;
    calculating an optimal virtual camera position for the 3D building model based on the defined look angle, the orientation of the 3D building model, and the determined architectural features, the optimal virtual camera position defining an optimal view of the 3D building model;
    generating the optimal view of the 3D building model from the optimal virtual camera position; and
    displaying the optimal view of the 3D building model.

8. The one or more non-transitory computer-readable media of claim 7, wherein calculating the first main axis comprises grouping lines of the 3D building model within an angular threshold of one another and selecting the group with the largest sum of weighted edge length for the grouped lines.

9. The one or more non-transitory computer-readable media of claim 7, wherein defining the look angle comprises defining the look angle for each of at least two planar geometries of the 3D building model.

10. The one or more non-transitory computer-readable media of claim 7, wherein determining the architectural features comprises:
    identifying the architectural features of the 3D building model; and
    ranking the identified architectural features.

11. The one or more non-transitory computer-readable media of claim 10, wherein calculating the optimal virtual camera position is further based on the ranked architectural features.

12. The one or more non-transitory computer-readable media of claim 7, wherein calculating the optimal virtual camera position is further based on combinations of the architectural features and layouts of the architectural features.

* * * * *